United States Patent [19]
Suzuki et al.

[11] Patent Number: 5,885,334
[45] Date of Patent: Mar. 23, 1999

[54] POLISHING FLUID COMPOSITION AND POLISHING METHOD

[75] Inventors: Tetsuo Suzuki; Yoshihiro Hara, both of Kobe, Japan

[73] Assignee: Kabushiki Kaisha Kobe Seiko Sho, Kobe, Japan

[21] Appl. No.: 857,366

[22] Filed: May 15, 1997

[30] Foreign Application Priority Data

May 15, 1996 [JP] Japan .................................. 8-120549
May 15, 1996 [JP] Japan .................................. 8-120550

[51] Int. Cl.$^6$ .................................................. C09K 13/04
[52] U.S. Cl. ........................... 106/3; 216/88; 216/89; 438/692; 438/693; 252/79.1; 252/79.5
[58] Field of Search ................... 51/308; 216/88, 216/89, 99, 108; 438/692, 693; 106/3; 252/79.2, 79.1, 79.5

[56] References Cited

U.S. PATENT DOCUMENTS 3,807,979  4/1974  Cromwell .................................... 106/3
5,397,430  3/1995  Philippot et al. ....................... 252/79.1

FOREIGN PATENT DOCUMENTS 49-13665 B   4/1974   Japan .
64-18228     1/1989   Japan .
1-193170     8/1989   Japan .
3-202269     9/1991   Japan .
4-63428      2/1992   Japan .
4-291722    10/1992   Japan .

OTHER PUBLICATIONS

"Tool Engineer" 1984, pp. 38–46.
"Journal of Japan Society of Lubication Engineers," vol. 33, No. 4, 1988, pp. 253–259.

*Primary Examiner*—Melissa Bonner
*Attorney, Agent, or Firm*—Oblon, Spivak, McClelland, Maier & Neustadt, P.C.

[57] ABSTRACT

The present invention provides a polishing fluid composition which can effectively polish a surface of a semiconductor silicon wafer or a surface of a film comprising silicon to be formed on silicon wafers with a markedly reduced amount of colloidal silica to be used as abrasives, or a polishing fluid composition which is particularly useful for a polishing step after removal of an oxide layer in a two-step polishing method. The former polishing fluid composition comprises an alkaline suspension which contains a water-soluble silicic acid component, colloidal silica and an alkaline component, and which has a pH value of 8.5 to 13. Meanwhile, the latter polishing fluid composition comprises an alkaline solution which contains a water-soluble silicic acid component and an alkaline component, and which has a pH value of 8.5 to 13; and is substantially free of abrasive particles.

19 Claims, 1 Drawing Sheet

POLISHING FLUID COMPOSITION AND POLISHING METHOD

BACKGROUND OF THE INVENTION

1. Field of the Invention

The present invention relates to a polishing fluid composition useful for polishing surfaces of semiconductor silicon wafers, or surfaces of films comprising silicon formed on silicon wafers (hereinafter, the term "silicon wafer" also includes such a film). Additionally, the present invention relates to a polishing method using such a polishing fluid composition.

2. Description of the Related Art

Hitherto, alkaline colloidal silica compositions comprising silica abrasives suspended in alkaline solutions have been widely used as polishing fluids for polishing surfaces of semiconductor silicon wafers. Although it is not clear when the use of colloidal silica as abrasives in such polishing fluids started, Japanese Examined Patent Publication No. 49-13665 has already disclosed that silica sol (colloidal silica) can be a suitable abrasive used for obtaining an accurate mirror surface.

Further, "Kikai to Kougu (Tool Engineer)" (August, 1984, pp.38–46, written by Toshiro Karaki) also describes that a mechanochemical polishing method using a soft synthetic leather polisher and an alkaline colloidal silica polishing fluid comprising silica fine particles suspended in an alkaline solution is generally employed for polishing semiconductor silicon wafers, and that such a method includes a mechanical polishing effect by the silica fine particles together with a chemical polishing effect by the alkaline solution, and can achieve a specular surface exhibiting extremely fine smoothness and satisfactory crystallinity.

In general, alkali hydroxides, ammonia, amines, and others are used solely or in combination as an alkaline component used in mechanochemical polishing, and these compounds are added and dissolved in the polishing fluid directly or in the form of salts. Additionally, the pH value of the polishing fluid is ordinarily adjusted to approximately 9 to 12, and solid fine particles such as silica particles or quartz particles having particle diameters of approximately 5 to 300 nm are used as abrasives, and are contained in the polishing fluid at approximately 1 to 50%.

Recently, various techniques in relation to polishing fluids were offered. For example, (1) Japanese Unexamined Patent Publication No. 4-291722 discloses an abrasive containing a nonionic surfactant having a HLB (hydrophilic lipophilic balance) value of 13 to 20, which is directed to obtaining a wafer surface without haze; (2) Japanese Unexamined Patent Publication No. 3-202269 discloses an abrasive comprising colloidal silica with the addition of a disinfectant, which is directed to prevention of bacterial proliferation in the abrasive slurry; and (3) Japanese Unexamined Patent Publication No. 4-63428 discloses an abrasive comprising silica particles and water with the addition of a water-soluble polymer and salts, which is directed to improvement of surface smoothness. Similar to the aforementioned method, these techniques utilize solid fine particles such as silica particles or quartz particles as abrasives.

Although polishing fluids merely utilizing solid fine particles such as zirconia particles or alumina particles as abrasives were also reported previous to the above techniques, almost all recent polishing fluids utilize the principle of mechanochemical polishing in which a mechanical polishing effect by solid fine particles as abrasives and a chemical polishing effect by an alkaline component are combined. Such mechanochemical polishing is employed as a technique capable of satisfying demand for a high removal rate, an excellent surface smoothness and flatness, and negligible processing damage.

Meanwhile, chemical polishing methods using abrasive-particle-free alkaline solutions as polishing fluids are well-known as polishing methods which do not cause processing damage. With only such chemical polishing, however, texture of the polished surface is inferior. In order to compensate for such inferiority, disk-system chemical polishing methods have been proposed (for example, in "Junkatsu (Lubrication)" Vol. 33, No. 4, pp.253–259, written by Toshiro Doi). In such methods, abrasion is carried out only with a chemical solution (polishing fluid) on a soft polisher such as abrasive cloth or a pad having the form of a flat disk. Such methods, however, cannot yet be effectively applied to silicon wafer polishing since polishing rates in these methods are slower than in the aforementioned mechanochemical polishing method using an alkaline colloidal silica composition as a polishing fluid.

As described above, conventional silicon wafer polishing fluids are generally based on the principle of mechanochemical polishing which includes a mechanical polishing effect by abrasive particles and a chemical polishing effect by an alkaline component, and such fluids contain solid fine particles such as silica particles having particle diameters of approximately 5 to 300 nm as abrasives. Accordingly, a large amount of the abrasive particles adhere to and remain on the surface of the silicon wafer polished with such a fluid, and elimination or removal of the residual particles is greatly disadvantageous in view of manufacturing process. In particular, since semiconductor devices have been increasingly densified in recent years, and even a trace amount of residual particles affect performance of produced semiconductor devices, imperfect elimination or removal of residual particles can possibly cause great problems.

Further, when abrasives are carried into a washing facility, other problems can also be caused. For example, the working environment and the apparatuses may be contaminated, the washing solution may become unusable within a short time period, or management of such an environment, apparatuses, and others may become complicated. Besides, the abrasives dispersed in the polishing fluid may separate, precipitate, or secondarily aggregate in the fluid, and therefore, labor is required for storage management of the polishing fluid. Additionally, when the abrasives secondarily aggregate and form larger particle diameters, the surface being polished can be scratched thereby, and in such a case, the polishing fluid cannot serve its original function any longer.

In contrast to such a mechanochemical polishing method, the above-described disk-system chemical method is performed using a polishing fluid substantially free of abrasives, and therefore, can be expected to be a practical method which can be performed without the above-described problems due to adhering and remaining abrasive particles. For such a method, however, any polishing fluid which can effectively polish silicon wafers has not yet been developed. Meanwhile, chemical polishing using a conventional polishing fluid is vitally defective due to an impractically low polishing rate as compared with mechanochemical polishing using an alkaline colloidal silica polishing fluid.

Under such circumstances, a polishing method comprising two steps (hereinafter referred to as "two-step polishing method") has been proposed in, for example, Japanese Unexamined Patent Publications Nos. 64-18228 and 1-193170. In this method, the process for polishing a silicon wafer is divided into two steps, namely, a step for removing an oxide layer formed on the top surface of a silicon wafer and a step for polishing the surface newly appearing after removal of the oxide layer; and a polishing fluid containing abrasives is used for removal of the oxide layer, and a polishing fluid without abrasives is used for polishing the newly appearing surface.

In such a two-step polishing method, the polishing time can be shortened since mechanochemical polishing using a polishing fluid containing abrasives is employed for rough polishing to remove the oxide layer, and the abrasive particles do not remain on the resulting polished surface since disk-system chemical polishing using a polishing fluid without abrasives is employed as a finish polishing to polish the newly appearing surface. Recently, such a two-step polishing method is particularly attracting attention since it has the advantages of both mechanochemical polishing and disk-system chemical polishing.

The two-step polishing method, however, has some problems. For example, since the finish polishing after removal of the oxide layer is performed using a polishing fluid substantially free of abrasive particles, it takes an excessive and impractically long time as a conventional polishing fluid without abrasive particles is used.

The present invention has been accomplished under such circumstances, and the first object of the present invention is to provide a polishing fluid composition which contains a remarkably reduced amount of colloidal silica acting as abrasives, does not cause the problems of the related art, and can effectively polish surfaces of semiconductor silicon wafers or surfaces of films comprising silicon formed on silicon wafers. Additionally, the second object of the present invention is to provide a polishing fluid composition especially useful for the polishing step after the oxide-layer-removing step in the aforementioned two-step polishing method.

Further, another object of the present invention is to provide a method for effectively polishing surfaces of semiconductor silicon wafers or surfaces of films comprising silicon formed on silicon wafers by using the aforementioned polishing fluid composition of the present invention.

SUMMARY OF THE INVENTION

The polishing fluid composition achieving the first object of the present invention is characterized by comprising an alkaline aqueous solution of a pH value of 8.5 to 13 containing a water-soluble silicic acid component, colloidal silica, and an alkaline component.

The polishing fluid composition achieving the second object of the present invention is characterized by comprising an alkaline aqueous solution of a pH value of 8.5 to 13 containing a water-soluble silicic acid component and an alkaline component; and by being substantially free of abrasive particles.

On the other hand, the polishing method achieving the above another object of the present invention is a method for polishing a surface of a semiconductor silicon wafer or a surface of a film comprising silicon formed on a silicon wafer, characterized by comprising:

a preceding polishing step using a polishing fluid containing abrasive particles; and a succeeding polishing step using a polishing fluid which comprises an alkaline aqueous solution of a pH value of 8.5 to 13 containing a water-soluble silicic acid component and an alkaline component, but does substantially not contain abrasive particles.

Among the polishing fluid compositions of the present invention, the polishing fluid composition which is used in the above-described succeeding polishing step and does not contain colloidal silica can be used for polishing silicon wafers even in cases where the above-described preceding step is not performed. In other words, in polishing surfaces of semiconductor silicon wafers or surfaces of films comprising silicon formed on silicon wafers by using a polishing pad, effective polishing of a surface of a semiconductor silicon wafer or the like can also be achieved according to a method comprising:

a step for applying a polishing fluid containing abrasive particles onto the surface of the pad; and a polishing step using a polishing fluid which comprises an alkaline aqueous solution of a pH value of 8.5 to 13 containing a water-soluble silicic acid component and an alkaline component, but does substantially not contain abrasive particles.

BRIEF DESCRIPTION OF THE DRAWING

The attached sole figure is a graph showing dependency of silicon wafer polishing rate on colloidal silica concentration.

DESCRIPTION OF THE PREFERRED EMBODIMENT

Figure 1:
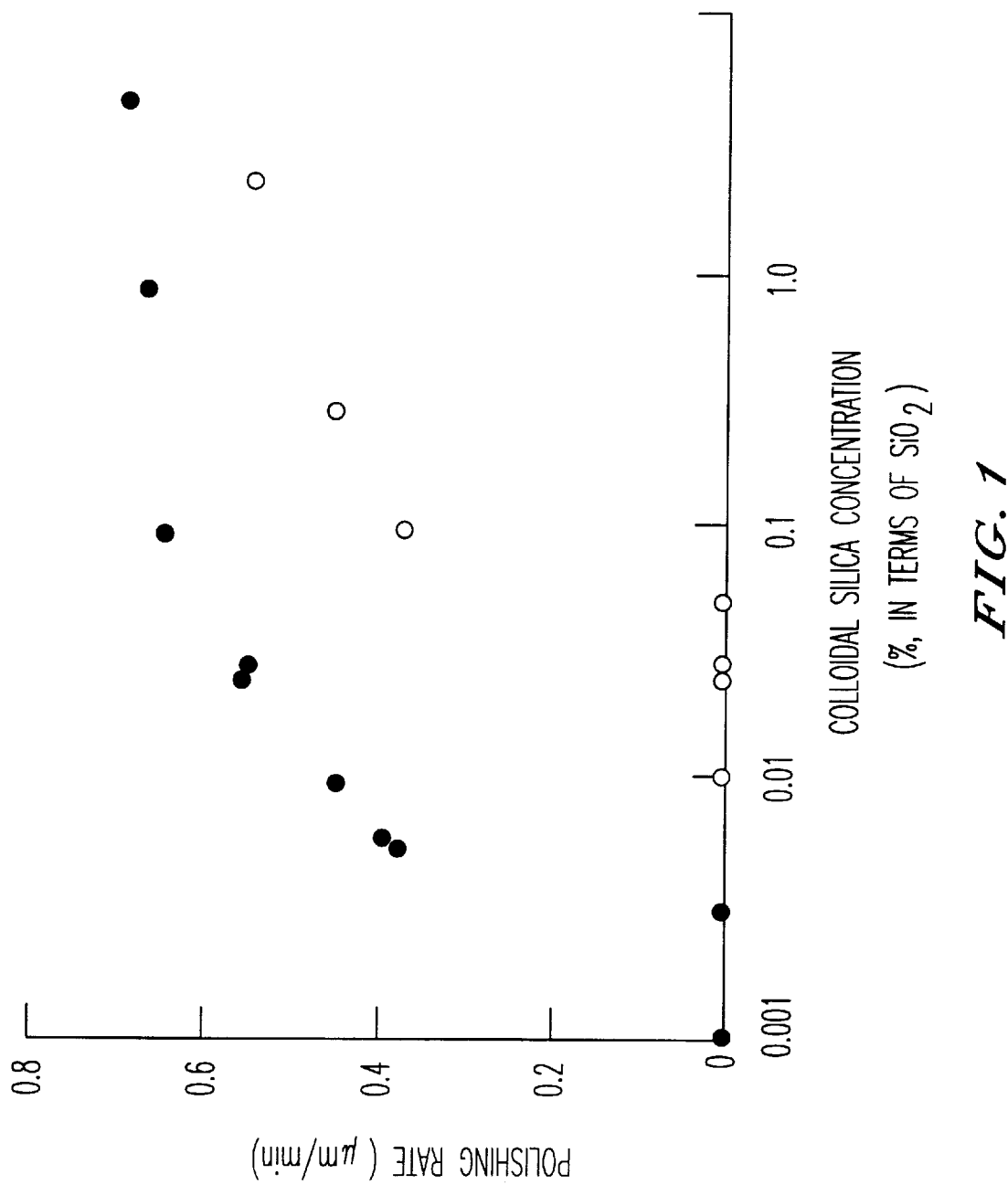

The construction of the present invention is as described above. Up to accomplishment of the present invention, the Inventors conducted research concerning effects of abrasive particles, alkaline components, and other additive components on the process for mechanochemically polishing silicon wafers, and found that a polishing fluid composition containing a water-soluble silicic acid component together with colloidal silica can effectively polish silicon wafer surfaces.

Further, the Inventors conducted research concerning effects of abrasive particles, alkaline components, and other additive components on the process for polishing silicon wafers according to a two-step polishing method, and found that the above-described second object can be splendidly achieved by using a polishing fluid composition comprising an alkaline aqueous solution of a pH value of 8.5 to 13 containing a water-soluble silicic acid component and an alkaline component as an abrasive-particle-free polishing fluid composition used for the second disk-system polishing step after removal of an oxide layer.

As is obvious from the purport of the above description, each of the above polishing fluid compositions is applicable not only for polishing silicon wafers themselves, but also for polishing surfaces of silicon films formed on silicon wafers. The effect of each polishing fluid composition according to the present invention will be illustrated below along with details up to accomplishment of the present invention.

Initially, among the polishing fluid composition according to the present invention, the effect of one polishing fluid composition will be illustrated, which contains colloidal silica and is used in an ordinary mechanochemical polishing process (not two-step polishing process). The Inventors examined dependency of the rate of polishing a silicon wafer on colloidal silica concentration using an alkaline colloidal silica suspension which contained sodium hydroxide and ammonia as an alkali component. As a result, the following findings were achieved: A specific concentration or more of colloidal silica is necessary for stably polishing silicon wafers; and the concentration of colloidal silica can be restricted to 1/10 times or less if a water-soluble silicic acid component such as potassium silicate and sodium silicate is added to the alkaline colloidal silica suspension so as to coexist with colloidal silica.

The graph in the attached figure shows the results of examination on colloidal silica concentration dependency of the silicon wafer polishing rate. In the graph, the symbols ○ and ● indicate the results of polishings performed under the conditions shown in Example 1 below using polishing fluids prepared as follows, respectively (in each fluid, the pH value was adjusted to 11.0 to 11.4).

○: A suspension which contained 40% by weight (in terms of $SiO_2$) of colloidal silica having an average particle diameter of 50 nm and had been stabilized with sodium hydroxide was diluted with a solution containing 0.2% by weight (in terms of $NH_3$) to a predetermined concentration.

●: A suspension which contained 40% by weight (in terms of $SiO_2$) of colloidal silica having an average particle diameter of 50 nm and had been stabilized with sodium hydroxide was diluted with a solution containing 0.1% by weight (in terms of $NH_3$), 0.4% by weight of a $SiO_2$ component and 0.25% by weight of a $K_2O$ component to a predetermined concentration.

As is obvious from the graph, when a polishing fluid without a water-soluble silicic acid component was used, a silicon wafer could quite not be polished with a colloidal silica concentration below 0.05% (in terms of $SiO_2$, similar in the following description) For stable polishing, the colloidal silica concentration is necessarily 0.1% by weight or more. Incidentally, although the graph shows typical experimental results, similar results could be obtained from combinations of other alkaline components and other water-soluble silicates.

In contrast, when potassium silicate was dissolved so as to coexist with colloidal silica, a practically sufficient polishing rate could be achieved even with an extremely low colloidal silica concentration of 0.005% by weight. Further, with a colloidal silica concentration above 5% by weight, although a slight increase in polishing rate could be recognized, the viscosity of the polishing fluid increased so that feeding of the polishing fluid became difficult to an impractical degree.

Since the content of colloidal silica in this polishing fluid composition can be restricted to ¹/₁₀ times or less that in a conventional polishing fluid without the coexistence of a water-soluble silicic acid component, adhesion and remaining of colloidal silica abrasives on the polished surface can be markedly reduced. Accordingly, the amount of colloidal silica abrasives carried into a post-polishing washing apparatus can be markedly reduced, and in response to this, the life of the washing solution can be elongated. Further, since the colloidal silica concentration in the polishing fluid can be reduced, secondary aggregation of colloidal silica particles can also be inhibited, and therefore, frequency of polish scratching by secondarily aggregated abrasive particles can be restricted.

Meanwhile, the inventors conducted research concerning effects of abrasive particles, alkaline components, and other additive components on the process for polishing silicon wafers according to a two-step polishing method; found that the above-described object can splendidly be achieved by using a polishing fluid composition comprising an alkaline aqueous solution of a pH value of 8.5 to 13 containing a water-soluble silicic acid component and an alkaline component as an abrasive-particle-free polishing fluid composition used for the second disk-system polishing step after removal of an oxide layer; and thus have accomplished the present invention. As is obvious from the purport of the above description, the polishing fluid compositions of the present invention are applicable not only for polishing silicon wafers themselves, but also for polishing surfaces of silicon films formed on silicon wafers. The effect of the present invention will be illustrated below along with details up to accomplishment of the present invention.

Subsequently, a polishing fluid composition of the present invention will be illustrated, which does not contain abrasive particles and is used for disk-system polishing as the second step succeeding the step for removing an oxide layer. Although the reason why such a polishing fluid composition significantly affects polishing of silicon wafers has not yet been sufficiently clarified, the action mechanism of each silicic acid component or alkaline component can broadly be presumed as follows. As is well-known, hydroxyl groups are chemically adsorbed in the surface of a silicon wafer in an alkaline aqueous solution. The bondings of silicon atoms with other silicon atoms become weak when the silicon atoms chemically adsorb hydroxyl groups, and such silicon atoms are dissolved in the alkaline aqueous solution. This is the generally-known dissolution mechanism of silicon atoms in alkaline solutions. If a silicic acid component is contained in the alkaline solution, the silicic acid molecules link with silicon atoms derived from the wafer surface which have been linked with hydroxyl groups when the silicon atoms are dissolved in the alkaline solution. As a result, presumably, the silicic acid molecules form condensed silicic acid molecules with the silicon atoms derived from the wafer surface to promote dissolution of silicon atoms in the alkaline aqueous solution.

Examples of the silicic acid component used in each polishing fluid composition of the present invention include orthosilicic acid ($H_4SiO_4$), metasilicic acid ($H_2SiO_3$), metadisilicic acid ($H_2Si_2O_5$), metatrisilicic acid ($H_4Si_3O_8$), and metatetrasilicic acid ($H_6Si_4O_{11}$). Each of these silicic acids can be suitably used and dissolved in an alkaline aqueous solution. Alternatively, silicates such as potassium silicate and sodium silicate can be used as the silicic acid component added to and dissolved in an alkaline aqueous solution. The silicate solution thus obtained may be subjected to ion exchange to obtain an aqueous solution containing the corresponding silicic acid derived from the silicate used. Further, silicic acid hydrates can also be used by dissolving in a hot alkaline aqueous solution. Each of these silicic acids and silicates can be used solely or in combination with the others without particular quantitative limitation. In practical view, the amount of the silicic acid component is preferably 0.05 to 5% by weight in terms of $SiO_2$ regardless to the composition (namely, regardless of the presence or absence of colloidal silica).

On the other hand, examples of the alkaline component used in the present invention include alkali hydroxides, alkali carbonates, ammonia, hydrazine, and organic amines, and each of these can be used solely or in combination with the others. Further, salts of these compounds can be used as the alkaline component. Incidentally, when silicates such as potassium silicate and sodium silicate are used as the above silicic acid component, such silicates can be utilized as an entire or partial substitution for the alkaline component.

Although the chemical composition of the alkaline component is not especially limited, its total amount should be adjusted such that the pH value of the polishing fluid falls within a range from 8.5 to 13. With a pH value below 8.5, the polishing rate will be low, and the polishing fluid can rarely maintain a stable solution state since the silicic acid component in the fluid is gelated. On the other hand, when the polishing fluid is prepared to be strongly alkaline as having a pH value above 13, the force needed for polishing becomes large since the pad and the wafer mutually adhere strongly, though the mechanism of the adhesion is unclear. As a result, the wafer may be broken during polishing in some cases. Further, since the chemical action becomes too strong, the balance between the mechanical abrasive effect and the chemical polishing effect deteriorates, and the polishing rate becomes low.

Although the basic specification of the polishing fluid composition according to the present invention has been described above, surfactants, chelators, and other additives can be added to the composition in order to give the composition additional properties. For example, the affinity of the polished wafer surface can be improved and generation of haze on the wafer can be inhibited by adding an additional nonionic surfactant with a HLB value of 12 to 20 to the above-described polishing fluid having the basic chemical composition. Further, addition of a chelator to the above-described polishing fluid having the basic chemical composition is effective since metallic residue adhering to the polishing surface can be reduced. Examples of other additives include acetylacetone, glycine, pyrocatechin, and ethylenediamineacetic acid.

Incidentally, the polishing fluid used for the initial polishing (in a case of the two-step polishing method), or that applied to the pad surface is not especially limited in the practice of each polishing method according to the present invention. Although any known polishing fluids containing abrasive particles can be used for the above purposes, it is most preferable to use the polishing fluid composition of the present invention for finish polishing with the addition of colloidal silica, namely, the polishing fluid composition of the present invention which can achieve the above-described first object of the present invention.

EXAMPLES

The present invention will be further illustrated in detail with reference to examples below. The examples described below are not directed to limiting the scope of the present invention, and any modifications upon the contents described above and below fall within the technical scope of the present invention.

Example 1

To 1,000 cm$^3$ of distilled water, 10 g of a sodium silicate solution containing 37% by weight of a $SiO_2$ component and 18% by weight of a $Na_2O$ component, and 5 cm$^3$ of an aqueous ammonia solution containing 25% by weight of a $NH_3$ component were added, and further, 1.3 cm$^3$ of a colloidal silica suspension containing 20% by weight (in terms of $SiO_2$) of silica particles having an average diameter of 50 nm was added to prepare a polishing fluid composition which comprised an alkaline sodium silicate solution containing sodium silicate and colloidal silica. According to a measurement using a pH meter, the pH value of the polishing fluid obtained was 11.6. Using this polishing fluid, three 30 mm square Si wafers stuck on one plate were polished under the polishing conditions described below. As a result, the polishing rate was 0.56 μm/min, and the smoothness of the polished surfaces was 0.7 nm in terms of center-line-average roughness (Ra).

| <Polishing Conditions> | |
|---|---|
| Polishing Apparatus: | Single-side polishing machine having a base plate with an outer diameter of 12 inches |
| Pad (Polisher): | Urethane foam |
| Polishing Fluid Feeding Rate: | 30 cm$^3$/min. |
| Rotating Speed of Base Plate: | 45 rpm |
| Polishing Pressure: | 400 gf/cm$^2$ |
| Polishing Temperature: | 25 to 36° C. |

Comparative Example 1

To 1,000 cm$^3$ of distilled water, 5 cm$^3$ of an aqueous ammonia solution containing 25% by weight of a $NH_3$ component was added, and further, 1.3 cm$^3$ of a colloidal silica suspension containing 20% by weight (in terms of $SiO_2$) of silica particles having an average diameter of 50 nm was added to prepare a polishing fluid composition containing colloidal silica. The pH value of the polishing fluid obtained was measured at 11.4. Using this polishing fluid, Si wafers were polished under the same polishing conditions as in Example 1. The Si wafers were, however, quite not polished even after polishing for 50 min., and the wafer surfaces remained as they had been before polishing.

Comparative Example 2

To 1,000 cm$^3$ of distilled water, 25 g of a potassium silicate solution containing 20% by weight of a $SiO_2$ component and 10% by weight of a $K_2O$ component was added, and further, 2.5 cm$^3$ of a colloidal silica suspension containing 20% by weight (in terms of $SiO_2$) of silica particles having an average diameter of 50 nm was added to prepare a polishing fluid composition comprising an alkaline potassium silicate solution containing potassium silicate and colloidal silica. The pH value of the polishing fluid obtained was measured at 14. Using this polishing fluid, polishing was performed under the same polishing conditions as in Example 1. As a result, the polishing rate was very low at 0.2 μm/min., and therefore, smoothness of the polished surface was not measured.

Example 2

To 1,000 cm$^3$ of distilled water, 25 g of a potassium silicate solution containing 20% by weight of a $SiO_2$ component and 10% by weight of a $K_2O$ component, and 5 cm$^3$ of an aqueous ammonia solution containing 25% by weight of a $NH_3$ component were added, and further, 1.5 cm$^3$ of a colloidal silica suspension containing 4% by weight (in terms of $SiO_2$) of silica particles having an average diameter of 50 nm was added to prepare a polishing fluid composition which comprised an alkaline potassium silicate solution containing potassium silicate and colloidal silica. The pH value of the polishing fluid obtained was measured at 11.1. Using this polishing fluid, Si wafers were polished under the same polishing conditions as in Example 1. As a result, the polishing rate was 0.45 μm/min, and the smoothness of the polished surfaces was 0.7 nm in terms of center-line-average roughness (Ra).

Comparative Example 3

A sodium silicate solution containing 2% by weight of a $SiO_2$ component was subjected to ion exchange using an ion exchange resin to obtain 1,000 cm$^3$ of a silicic acid solution having a pH value of 2.5. To this silicic acid solution, 10 cm$^3$ of a colloidal silica suspension containing 20% by weight (in terms of $SiO_2$) of silica particles having an average diameter of 50 nm was added, and further, the pH value was adjusted to 7.8 by adding potassium hydroxide. The resulting solution could not be used as a polishing fluid since gelation occurred with passage of time.

Example 3

To 1,000 $cm^3$ of distilled water, 25 g of a potassium silicate solution containing 20% by weight of a $SiO_2$ component and 10% by weight of a $K_2O$ component, and 5 $cm^3$ of an aqueous ammonia solution containing 25% by weight of a $NH_3$ component were added, and further, 1.5 $cm^3$ of a colloidal silica suspension containing 20% by weight (in terms of $SiO_2$) of silica particles having an average diameter of 50 nm was added to prepare a polishing fluid composition which comprised an alkaline sodium silicate solution containing sodium silicate and colloidal silica. The pH value of the polishing fluid obtained was measured at 11.1. Using this polishing fluid, 4-inch Si wafers were polished under the polishing conditions described below. As a result, the polishing rate was 1.0 μm/min, and the smoothness of the polished surfaces was 0.7 nm in terms of center-line-average roughness (Ra).

| <Polishing Conditions> | |
| --- | --- |
| Polishing Apparatus: | Single-side polishing machine having a base plate with an outer diameter of 620 mm |
| Pad (Polisher): | Urethane foam |
| Polishing Fluid Feeding Rate: | 200 $cm^3$/min. |
| Rotating Speed of Base Plate: | 50 rpm |
| Polishing Pressure: | 400 $gf/cm^2$ |
| Polishing Temperature: | 25 to 36° C. |

Referential Example 1

A colloidal silica solution containing 2.5% by weight (in terms of $SiO_2$) of silica particles having an average diameter of 60 nm was prepared, and the pH value of the solution was adjusted to 11 with Alkanol amine. Using the polishing slurry thus obtained, 4-inch Si wafers were polished under the same polishing conditions as in Example 3. As a result, the polishing rate was 1.1 μm/min, and the smoothness of the polished surfaces was 1.0 nm in terms of Ra.

Referential Example 2

A colloidal silica solution containing 2.5% by weight (in terms of $SiO_2$) of silica particles having an average diameter of 50 nm was prepared, and the pH value of the solution was adjusted to 11.4 with an aqueous ammonia solution containing 25% by weight of a $NH_3$ component. Using the polishing slurry thus obtained, 4-inch Si wafers were polished under the same polishing conditions as in Example 3. As a result, the polishing rate was 1.2 μm/min, and the smoothness of the polished surfaces was 0.8 nm in terms of center-line-average roughness (Ra)

Referential Example 3

A colloidal silica solution containing 2.5% by weight (in terms of $SiO_2$) of silica particles having an average diameter of 50 nm was prepared, and the pH value of the solution was adjusted to 10.5 by adding potassium hydroxide. Using the polishing slurry thus obtained, 4-inch Si wafers were polished under the same polishing conditions as in Example 3. As a result, the polishing rate was 0.8 μm/min, and the smoothness of the polished surfaces was 0.8 nm in terms of center-line-average roughness (Ra).

Example 4

A colloidal silica suspension containing 3.0% by weight (in terms of $SiO_2$) of silica particles having an average diameter of 60 nm was prepared, and the pH value of the solution was adjusted to 11.0 with ethanolamine to prepare a polishing fluid A. Meanwhile, as a polishing fluid B, an alkaline sodium silicate solution was prepared by adding, to 1,000 $cm^3$ of distilled water, 10 g of a sodium silicate solution which contained 37% by weight of a $SiO_2$ component and 18% by weight of a $Na_2O$ component, and 5 $cm^3$ of an aqueous ammonia solution which contained 25% by weight of a $NH_3$ component. The pH value of the polishing fluid B was measured at 11.3. Using these polishing fluids, 4-inch Si wafers were polished under the polishing conditions described below.

| <Polishing Conditions> | |
| --- | --- |
| Polishing Apparatus: | Single-side polishing machine having a base plate with an outer diameter of 620 mm |
| Pad (Polisher): | Urethane foam |
| Polishing Fluid Feeding Rate: | 200 $cm^3$/min. |
| Rotating Speed of Base Plate: | 50 rpm |
| Polishing Pressure: | 400 $gf/cm^2$ |
| Polishing Temperature: | 25 to 36° C. |

Initially, rough polishing was performed for 2 min. using the polishing fluid A, and subsequently, the polishing fluid was replaced with the polishing fluid B, and finish polishing was performed for 23 min. The average polishing rate, which was calculated by dividing the amount removed during polishing by the total polishing time (25 min.), was 1.0 μm/min, and the smoothness of the polished surfaces was 0.7 nm in terms of center-line-average roughness (Ra).

Example 5

A colloidal silica suspension containing 2.0% by weight (in terms of $SiO_2$) of silica particles having an average diameter of 50 nm was prepared, and the pH value of the solution was adjusted to 11.3 with an aqueous ammonia solution to prepare a polishing fluid C. Meanwhile, as a polishing fluid D to be used in a second step, an alkaline potassium silicate solution was prepared by adding, to 1,000 $cm^3$ of distilled water, 25 g of a sodium silicate solution which contained 20% by weight of a $SiO_2$ component and 10% by weight of a $K_2O$ component, and 5 $cm^3$ of an aqueous ammonia solution which contained 25% by weight of a $NH_3$ component. The pH value of the polishing fluid D was measured at 11.2. Using these polishing fluids, 4-inch Si wafers were polished under the polishing conditions described below.

| <Polishing Conditions> | |
| --- | --- |
| Polishing Apparatus: | Single-side polishing machine having a base plate with an outer diameter of 620 mm |
| Pad (Polisher): | Urethane foam |
| Polishing Fluid Feeding Rate: | 200 $cm^3$/min. |
| Rotating Speed of Base Plate: | 50 rpm |
| Polishing Pressure: | 400 $gf/cm^2$ |

-continued

| <Polishing Conditions> | |
| --- | --- |
| Polishing Temperature: | 25 to 36° C. |

Initially, rough polishing was performed for 2 min. using the polishing fluid C, and subsequently, the polishing fluid was replaced with the polishing fluid D, and finish polishing was performed for 23 min. The average polishing rate, which was calculated by dividing the amount removed during polishing by the total polishing time (25 min.), was 0.9 μm/min, and the smoothness of the polished surfaces was 0.8 nm in terms of center-line-average roughness (Ra).

Example 6

A colloidal silica suspension containing 2.5% by weight (in terms of $SiO_2$) of silica particles having an average diameter of 50 nm was prepared, and the pH value of the solution was adjusted to 11.3 with an aqueous ammonia solution. The suspension (150 cm³) thus obtained was applied onto a pad surface previous to polishing. Meanwhile, as a polishing fluid, an alkaline potassium silicate solution was prepared by adding, to 1,000 cm³ of distilled water, 25 g of a sodium silicate solution which contained 20% by weight of a $SiO_2$ component and 10% by weight of a $K_2O$ component, and 5 cm³ of an aqueous ammonia solution which contained 25% by weight of a $NH_3$ component. The pH value of the polishing fluid was measured at 11.2. Using this polishing fluid, 4-inch Si wafers were polished under the polishing conditions described below.

| <Polishing Conditions> | |
| --- | --- |
| Polishing Apparatus: | Single-side polishing machine having a base plate with an outer diameter of 620 mm |
| Pad (Polisher): | Urethane foam |
| Polishing Fluid Feeding Rate: | 200 cm³/min. |
| Rotating Speed of Base Plate: | 50 rpm |
| Polishing Pressure: | 400 gf/cm² |
| Polishing Temperature: | 25 to 36° C. |

Initially, the wafers were roughly polished with the pad to which the above-prepared colloidal silica suspension was applied. Subsequently, finish polishing was performed using the above-prepared polishing fluid for 25 min. As a result, the polishing rate was 1.1 μm/min, and the smoothness of the polished surfaces was 0.8 nm in terms of center-line-average roughness (Ra).

Example 7

To 1,000 cm³ of distilled water, 25 g of a potassium silicate solution containing 20% by weight of a $SiO_2$ component and 10% by weight of a $K_2O$ component, and 5 cm³ of an aqueous ammonia solution containing 25% by weight of a $NH_3$ component were added, and further, 3 cm³ of a colloidal silica suspension containing 20% by weight (in terms of $SiO_2$) of silica particles having an average diameter of 50 nm was added to prepare a polishing fluid E. The pH value of the polishing fluid E was measured at 11.1. Using this polishing fluid E instead of the polishing fluid C, 4-inch Si wafers were polished under the same conditions as in Example 5. As a result, the polishing rate was 1.0 μm/min, and the smoothness of the polished surfaces was 0.8 nm in terms of center-line-average roughness (Ra)

Comparative Example 4

An aqueous ammonia solution having a pH value adjusted to 11.3 was prepared as a polishing fluid to be used for the second step polishing. Using this aqueous ammonia solution instead of the polishing fluid C, 4-inch Si wafers were polished under the same conditions as in Example 5. The average polishing rate, which was calculated by dividing the amount removed during polishing by the total polishing time (25 min.), was 0.56 μm/min, and the smoothness of the polished surfaces was 0.8 nm in terms of center-line-average roughness (Ra).

Comparative Example 5

Polishing in a manner similar to Example 6 was performed except that an aqueous ammonia solution having a pH value adjusted to 11.3 was used instead of the polishing fluid. By this polishing method, the polishing rate was very low, and the wafers could not be made specular over their entire surfaces.

Comparative Example 6

An aqueous ammonia solution having a pH value adjusted to 10.8 was prepared as a polishing fluid to be used for the second step polishing. Using this aqueous ammonia solution instead of the polishing fluid D, 4-inch Si wafers were polished under the same conditions as in Example 5. The average polishing rate, which was calculated by dividing the amount removed during polishing by the total polishing time (25 min.), was 0.57 μm/min, and the smoothness of the polished surfaces was 0.8 nm in terms of center-line-average roughness (Ra).

As is obvious from the results obtained in Examples 1 to 3, Comparative Examples 1 to 3, and Referential Examples 1 to 3, a polishing rate and a smoothness of the polished surface equal to those achieved by conventional colloidal silica polishing slurries can be achieved by using the polishing fluid compositions of the present invention containing colloidal silica. Meanwhile, the polishing fluids failing to satisfy the specification according to the present invention have been found to be incompetent to achieve the expected polishing effects.

Additionally, as is obvious from the results obtained in Examples 4 to 7 and Comparative Examples 4 to 6, a polishing rate and a smoothness of the polished surface equal to those achieved by conventional colloidal silica polishing slurries can be achieved by using the colloidal-silica-free polishing fluid compositions of the present invention for finishing polishing in a two-step polishing method. Meanwhile, the polishing fluids failing to satisfy the specification according to the present invention, and the fluid comprising a diluted aqueous ammonia solution or ethanolamine alone have been found to be incompetent to achieve the expected polishing effects.

As described above, according to the present invention, since the content of colloidal silica in the polishing fluid composition can be restricted to 1/10 times or less that in a conventional polishing fluid without the coexistence of a water-soluble silicic acid component, adhesion and remaining of colloidal silica abrasive particles on the polished surface can be markedly reduced. Accordingly, the polishing fluid composition which could be obtained in the present invention does not cause the problems of the related art, and can effectively polish surfaces of semiconductor silicon wafers or surfaces of films comprising silicon formed on silicon wafers. Additionally, according to the present invention, there could be provided a polishing fluid composition to be used for the finish polishing in a two-step polishing method. Since this polishing fluid composition does substantially not contain abrasives, it can effectively polish the surfaces of silicon wafers or the like without causing any problems of the prior art due to adhering and remaining abrasives.

What is claimed is:

1. A polishing fluid composition for silicon products, comprising an alkaline suspension which contains a water-soluble silicic acid component, colloidal silica and an alkaline component, and has a pH value of 8.5 to 13, wherein the content of said silicic acid component is 0.05 to 5% by weight in terms of $SiO_2$ and the content of said colloidal silica is 0.005 to about 1% by weight in terms of $SiO_2$.

2. The polishing fluid composition according to claim 1, wherein said alkaline component comprises at least one composition selected from the group consisting of alkali hydroxides, alkali carbonates, ammonia, hydrazine, and organic amines.

3. A chemical-mechanical polishing fluid composition for silicon products, comprising an alkaline solution which contains a water-soluble silicic acid component and an alkaline component, and has a pH value of 8.5 to 13; and said composition being substantially free of abrasive particles.

4. The chemical-mechanical polishing fluid composition according to claim 3, wherein the content of said silicic acid component is 0.05 to 5% by weight in terms of $SiO_2$.

5. The chemical-mechanical polishing fluid composition according to claim 3, wherein said alkaline component comprises at least one composition selected from the group consisting of alkali hydroxides, alkali carbonates, ammonia, hydrazine, and organic amines.

6. A method for polishing a surface of a semiconductor silicon wafer comprising:
    a preceding polishing step using a polishing fluid containing abrasive particles; and
    a succeeding polishing step using a polishing fluid according to claim 3.

7. The polishing method according to claim 6, wherein the polishing fluid used in said preceding polishing step is a polishing fluid composition comprising an alkaline suspension which contains a water-soluble silicic acid component, colloidal silica and an alkaline component, and has a pH value of 8.5 to 13.

8. The polishing method according to claim 7, wherein the content of said silicic acid component of the polishing fluid used in said preceding polishing step is 0.05 to 5% by weight in terms of $SiO_2$.

9. The polishing method according to claim 7, wherein the content of said colloidal silica of the polishing fluid used in said preceding step is 0.005 to 5% by weight in terms of $SiO_2$.

10. The polishing method according to claim 7, wherein said alkaline component of the polishing fluid used in said preceding step comprises at least one composition selected from the group consisting of alkali hydroxides, alkali carbonates, ammonia, hydrazine, and organic amines.

11. A method for polishing, using a polishing pad, a surface of a semiconductor silicon wafer, the method comprising:
    a step for applying a polishing fluid containing abrasive particles onto the surface of the polishing pad;
    a step of polishing said surface with the pad; and
    a polishing step using a polishing fluid according to claim 3.

12. The polishing method according to claim 11, wherein the polishing fluid to be applied to the polishing pad is a polishing fluid composition comprising an alkaline suspension which contains a water-soluble silicic acid component, colloidal silica and an alkaline component, and has a pH value of 8.5 to 13.

13. The polishing method according to claim 12, wherein the content of said silicic acid component of the polishing fluid to be applied to the polishing pad is 0.05 to 5% by weight in terms of $SiO_2$.

14. The polishing method according to claim 12, wherein the content of said colloidal silica of the polishing fluid to be applied to the polishing pad is 0.005 to 5% by weight in terms of $SiO_2$.

15. The polishing method according to claim 12, wherein said alkaline component of the polishing fluid to be applied to the polishing pad comprises at least one composition selected from the group consisting of alkali hydroxides, alkali carbonates, ammonia, hydrazine, and organic amines.

16. A method for polishing a surface of a semiconductor silicon wafer or a surface of a film comprising silicon formed on a silicon wafer, comprising:
    a preceding polishing step using a polishing fluid containing abrasive particles; and
    a succeeding polishing step using a polishing fluid according to claim 4.

17. A method for polishing a surface of a semiconductor silicon wafer or a surface of a film comprising silicon formed on a silicon wafer, comprising:
    a preceding polishing step using a polishing fluid containing abrasive particles; and
    a succeeding polishing step using a polishing fluid according to claim 5.

18. A method for polishing, using a polishing pad, a surface of a semiconductor silicon wafer, the method comprising:
    a step for applying a polishing fluid containing abrasive particles onto the surface of the polishing pad;
    a step of polishing said surface with the pad; and
    polishing step using a polishing fluid according to claim 4.

19. A method for polishing, using a polishing pad, a surface of a semiconductor silicon wafer, the method comprising:
    a step for applying a polishing fluid containing abrasive particles onto the surface of the polishing pad;
    a step of polishing said surface with the pad; and
    a polishing step using a polishing fluid according to claim 5.

* * * * *